United States Patent
Koyama

(10) Patent No.: US 7,751,702 B2
(45) Date of Patent: Jul. 6, 2010

(54) DIGITAL CAMERA

(75) Inventor: Hiroki Koyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 916 days.

(21) Appl. No.: 11/438,760

(22) Filed: May 23, 2006

(65) Prior Publication Data

US 2006/0269280 A1 Nov. 30, 2006

(30) Foreign Application Priority Data

May 26, 2005 (JP) .............................. 2005-153817

(51) Int. Cl.
*G03B 17/00* (2006.01)
*H04N 1/00* (2006.01)
(52) U.S. Cl. .................... 396/429; 348/207.2; 358/537; 358/540; 345/629
(58) Field of Classification Search ................. 396/429; 358/1.1, 1.2, 450, 452, 501, 537–538, 540; 348/207.2, 222.1, 231.2, 239, 239.1, 375; 710/30; 345/619, 629
See application file for complete search history.

(56) References Cited

U.S. PATENT DOCUMENTS

| | | | | |
|---|---|---|---|---|
| 5,592,305 A * | 1/1997 | Iwadate et al. | ............... | 358/448 |
| 6,549,681 B1* | 4/2003 | Takahashi et al. | ........... | 382/294 |
| 7,298,520 B2* | 11/2007 | Ohkubo et al. | ............. | 358/1.18 |
| 2005/0140789 A1* | 6/2005 | Yasuda | .................... | 348/207.2 |
| 2005/0253868 A1* | 11/2005 | Ageishi et al. | ............... | 345/629 |

FOREIGN PATENT DOCUMENTS

JP  2000-236507  8/2000

* cited by examiner

*Primary Examiner*—Bot LeDynh
(74) *Attorney, Agent, or Firm*—Volpe and Koenig, P.C.

(57) ABSTRACT

The digital camera capable of printing shot images by directly connecting a digital camera to the printing device, and even if the printing device does not support at least one of the index printing and the multiple printing, a synthetic image corresponding to the printing mode not supported by the printing device is generated by the digital camera and is sent to the printing device. Thereby, even if the printing device does not support one of, or both of the index printing and the multiple printing, the index printing and/or the multiple printing can be conducted.

4 Claims, 10 Drawing Sheets

DIGITAL CAMERA

CROSS-REFERENCE TO RELATED APPLICATION

This application is based upon and claims the benefit of priority from prior Japanese Patent Application No. 2005-153817, filed on May 26, 2005, the entire contents of which are incorporated herein by reference.

BACKGROUND OF THE INVENTION

1. Field of the Invention

The present invention relates to a digital camera equipped with a so-called direct printing function, which enables printing shot images only by directly connecting a printing device thereto.

2. Description of the Related Art

In recent years, a lot of digital cameras and printing devices equipped with a direct printing function have been introduced to the market. By using both the digital camera and printing device, which are equipped with this function, a user can print shot images easily without using a PC (Personal Computer).

FIG. 9 is a view explaining the overall action of direct printing in the case in which a digital camera and a printing device equipped with the direct printing function are directly connected to each other.

As shown in FIG. 9, when the digital camera (DSC) and the printing device (PRT) are directly connected to each other, the PRT first sends a direct printing connection request to the DSC to determine whether or not the DSC is equipped with a direct printing function (S61). In response to the request, the DSC notifies the PRT that the DSC is equipped with the direct printing function by sending a direct printing connection response (S62).

Subsequently, the DSC sends a printing function acquisition request to the PRT in order to acquire printing functions supported by the PRT (S63). In response to the request, the PRT notifies the DSC of the functions that the PRT supports (S64).

For the functions supported by the PRT, various modes, such as a one-frame printing, an all-frame printing, an index printing, a multiple printing may be included.

Subsequently, the DSC sends a printing paper size acquisition request to the PRT in order to acquire the size of printing papers (the size of printing mediums) supported by the PRT (S65). In response to the request, the PRT notifies the DSC of the sizes of printing paper the PRT supports (S66).

Subsequently, the DSC sends a Paper Quality acquisition request to the PRT in order to acquire the quality of papers ("PaperQuality", the quality of printing mediums) supported by the PRT (S67). In response to the request, the PRT notifies the DSC of the qualities of paper that the PRT supports (S68).

Subsequently, the DSC designates the kind of printing and the images to be printed to the PRT according to an instruction by a user (S69). The PRT responds to the instruction (S70), and also the PRT sends the DSC a printing image data acquisition request in order to acquire the image data of the images to be printed (S71). In response to the request, the DSC sends the image data to the PRT according to the request (S72). In this instance, if a plurality of images are designated in S69, steps in S71 and S72 are repeated for each image. Then, when the PRT acquires all the necessary image data for printing, the PRT performs a printing process (S73), and actually prints the images to the printing paper.

FIGS. 10A to 10C are views explaining examples of printing results of the direct printing. For example, in the case where four shot images, A, B, C and D, are recorded in a storage portion of the digital camera, as shown in FIG. 10A, if the index printing is performed, the four shot images are arranged and printed on a piece of printing paper, as shown in FIG. 10B. Otherwise, if the multiple printing of the shot image A is performed, a plurality of (four in this example) the shot images A are arranged and printed on a piece of printing paper, as shown in FIG. 10C.

Incidentally, the index printing is a printing method for displaying a plurality of images on a printing medium. For example, Japanese Unexamined Patent Publication No. 2000-236507 discloses an image file storage method in which a plurality of images are displayed as one synthetic image by generating a synthetic image in which a plurality of images are arranged.

However, various printing functions which are supported by the equipped direct printing functions but not supported by both the digital camera and the printing device cannot be used. For example, even if a digital camera supports printing modes such as the index printing and the multiple printing, but a printing device does not support them, the index printing or the multiple printing cannot be performed even though the digital camera and the printing device are connected to each other.

BRIEF SUMMARY OF THE INVENTION

A digital camera according to the present invention is capable of printing shot images by directly connecting a printing device thereto, and when the printing device does not support at least one of an index printing and a multiple printing, a synthetic image corresponding to one for that not supported printing mode is generated and sent to the printing device.

According to the present invention, even if the printing device does not support one of, or both of the index printing and the multiple printing, the index printing and/or the multiple printing can be conducted. Therefore, the convenience for the user can be improved.

An example of a structure of the digital camera according to the present invention will be described. A digital camera capable of printing shot images by directly connecting a printing device thereto, comprising: a determination portion for determining whether or not the printing device supports an index printing when the printing device is directly connected to the digital camera a recording portion for recording shot images; a small image acquisition portion for acquiring small images of shot images recorded in the recording portion; and a synthetic image generation portion for generating a synthetic image by arranging the small images, wherein when the index printing is performed in the case in which the determination portion determines that the printing device does not support the index printing, the small image acquisition portion acquires small images of all shot images, the synthetic image generation portion generates one or a plurality of synthetic images, in each of which a predetermined number of small images of all the shot images are arranged, and the one or the plurality of the synthetic images are sent to the printing device.

By replacing the "index printing" with a "multiple printing", the above-mentioned structure can be understood as a different structure. In addition, the present invention can be also understood as a printing method of a digital camera.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

The preferred embodiments of the present invention are described below with reference to the accompanying drawings.

Figure 1:
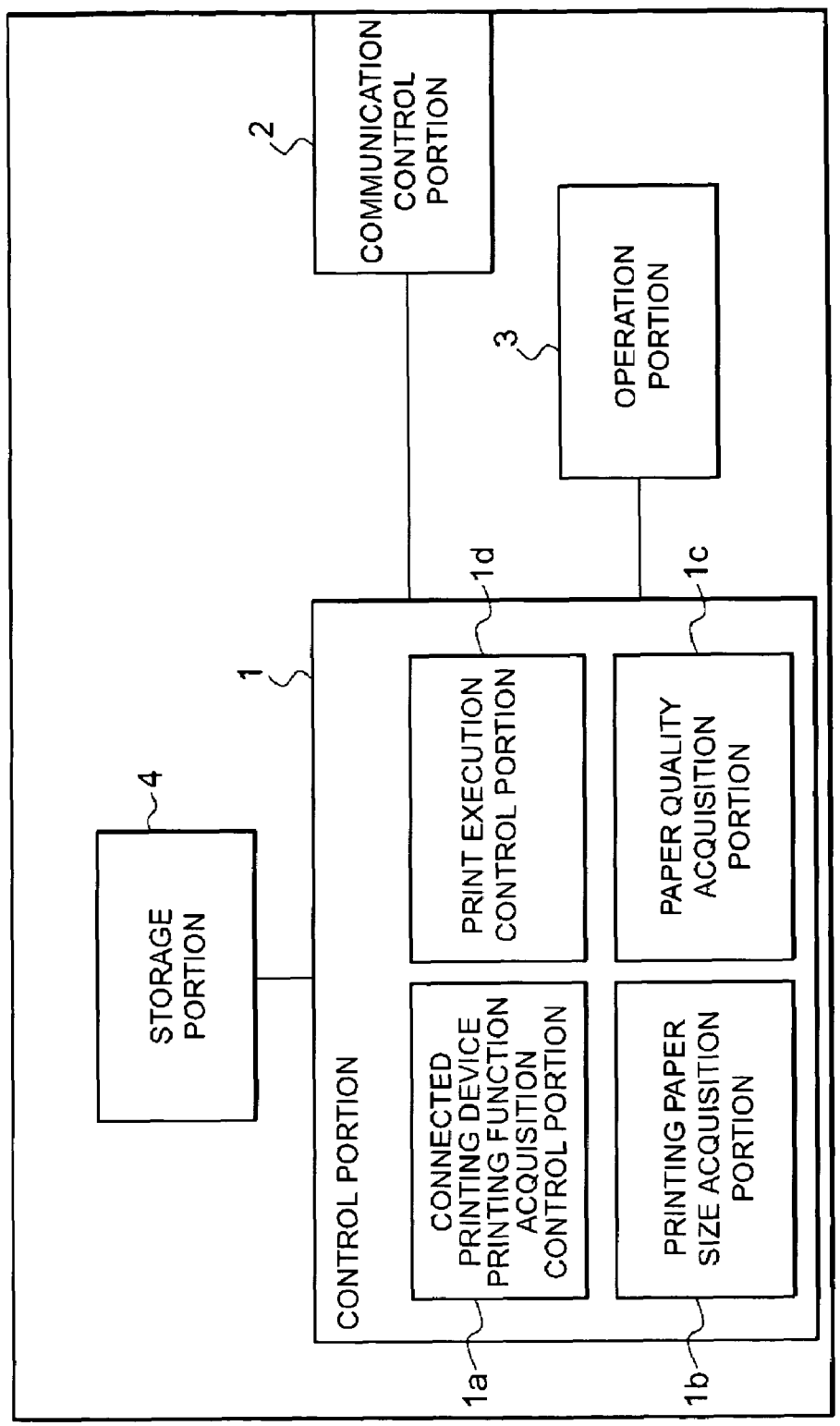
FIG. 1 is a view showing a main structure regarding a direct printing in a digital camera equipped with a direct printing function according to an embodiment.

FIG. 1 is a view showing a main structure regarding the direct printing in a digital camera equipped with a direct printing function according to an embodiment of the present invention.

In FIG. 1, a control portion 1 is a portion for controlling an overall action of the digital camera. For example, the control portion corresponds to a CPU. The control portion 1 includes a connected printing device printing function acquisition portion (printing function acquisition portion of a connected printing device) 1a, a printing paper size acquisition portion (a portion for acquiring the size of printing medium) 1b, and a Paper Quality acquisition portion (a portion for acquiring quality of the printing medium) 1c, and a print execution control portion 1d. For example, the functions of the connected printing device printing function acquisition portion 1a, the printing paper size acquisition portion (printing medium size acquiring portion) 1b, and the Paper Quality acquisition portion (printing medium quality acquisition portion) 1c, and the print execution control portion 1d are realized by executing one program having all the functions thereof, or a plurality of programs having each function thereof on the above mentioned CPU. However, not limited by these examples, each of the functions may be performed in a dedicated circuit.

In this instance, the connected printing device printing function acquisition portion 1a acquires printing functions (including printing modes) supported by the printing device, from the printing device which is equipped with the direct printing function and connected to the digital camera. The printing paper size acquisition portion 1b acquires the sizes of the printing paper supported (the size of the printing medium) by the printing device, from the printing device. The Paper Quality acquisition portion 1c acquires the paper quality (the qualities of the printing medium) supported by the printing device, from the printing device. The print execution control portion 1d controls the print execution of the printing device via a communication control portion 2.

The communication control portion 2 controls communication conducted between the printing device equipped with the printing function and connected to the digital camera, and the digital camera. In this instance, the digital camera and the printing device are directly connected to each other, for example, by a USB (Universal Serial Bus). And the communication control portion 2 is, for example, realized by a dedicated I/F circuit.

An operation portion 3 is provided with various buttons or various switches, and the like, (not shown) such as an arrow pad to select menu items on a display screen or to select images, an OK button to instruct confirmation on a display screen or selecting images, and the like, and instructions received are delivered to the control portion 1.

A storage portion 4 records image files of images shot by the digital camera. Incidentally, the digital camera of the present embodiment complies with DFC standard, and the image file of each image shot by the digital camera includes a small image of the main image (the original image) along with the image data thereof. In the present embodiment, the above-mentioned small image corresponds to an image data of a thumbnail image. For example, the storage portion 4 corresponds to a built-in memory such as a RAM, or a removable storage medium such as a memory card.

Next, an explanation is provided with regard to an action of the direct printing of the digital camera performed when the digital camera having the above-mentioned configuration is connected to the printing device equipped with the direct printing function.

In this instance, it is assumed that the direct printing function equipped by the digital camera supports both of the index printing mode and the multiple printing mode.

Figure 9:
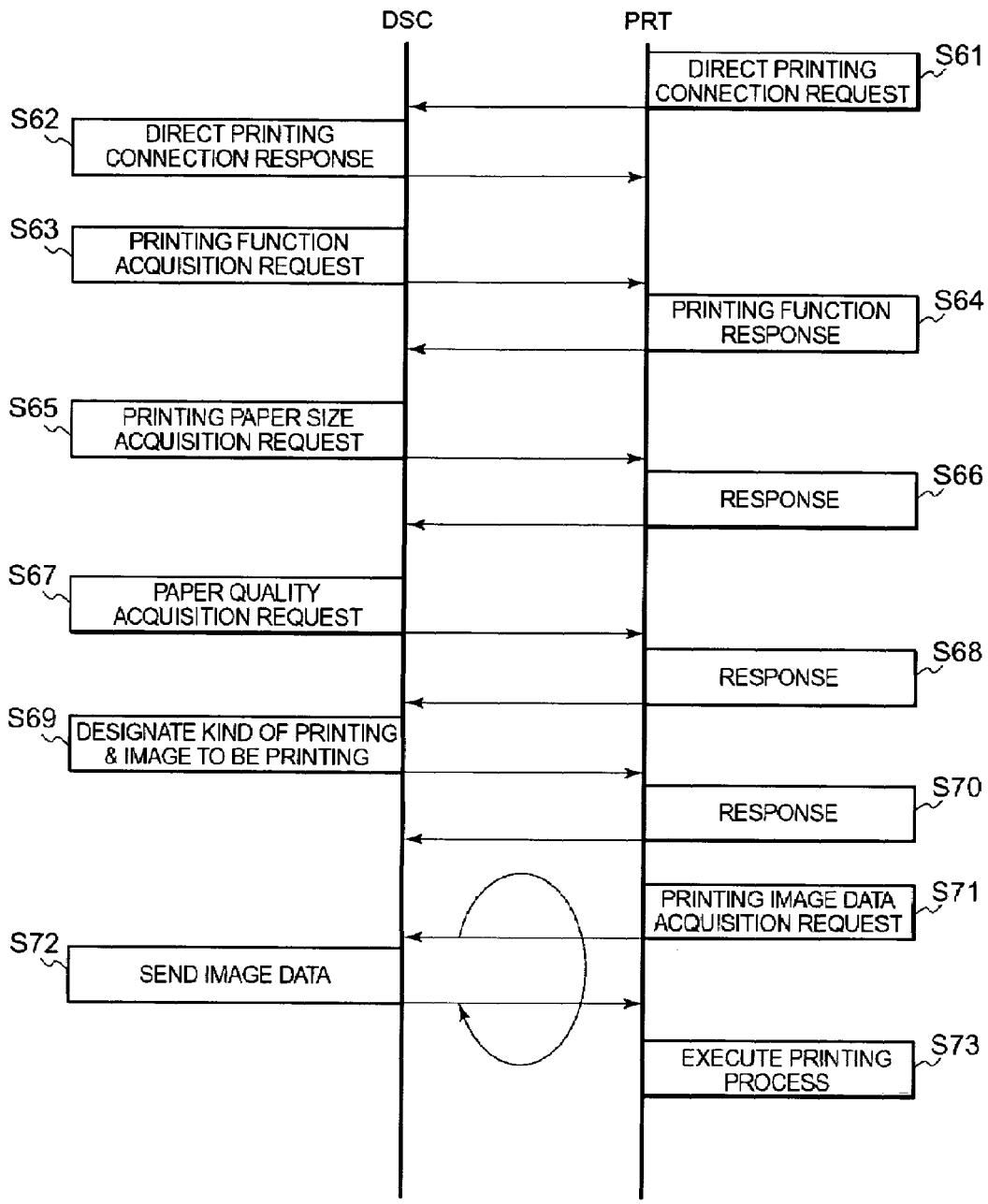
FIG. 9 is a view explaining an overall action of the direct performed in the case in which the digital camera and the printing device equipped with the direct printing function are directly connected to each other.
Figure 10A:
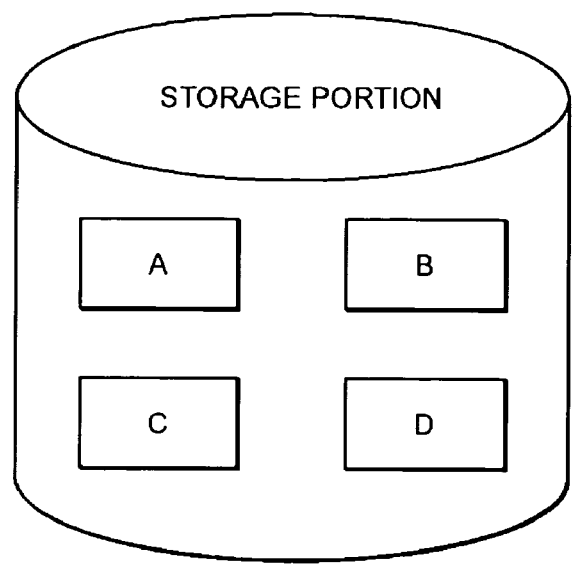
FIGS. 10A to 10C are views explaining examples of printing results of the direct printing.
Figure 10B:
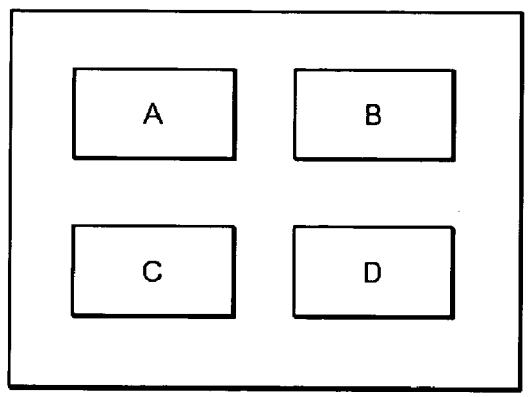
Figure 10C:
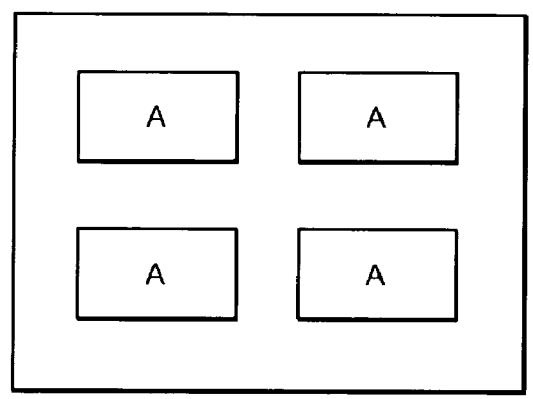

The actions of the direct printing of the digital camera is almost the same as the above-mentioned actions of the DSC explained with reference to FIG. 9, however, when a user designates one of the index printing and the multiple printing, which is not supported by the direct printing function equipped by the printing device connected to the digital camera, the actions from S69 will differ. That is, in the DSC explained with reference to FIG. 9, one of the index printing and the multiple printing, which is not supported by the printing device cannot be performed, however, the digital camera of the present invention is able to perform this.

Hereinbelow, actions for performing the index printing or the multiple printing, which is not supported by the printing device connected to the digital camera, will be explained in detail.

Figure 2:
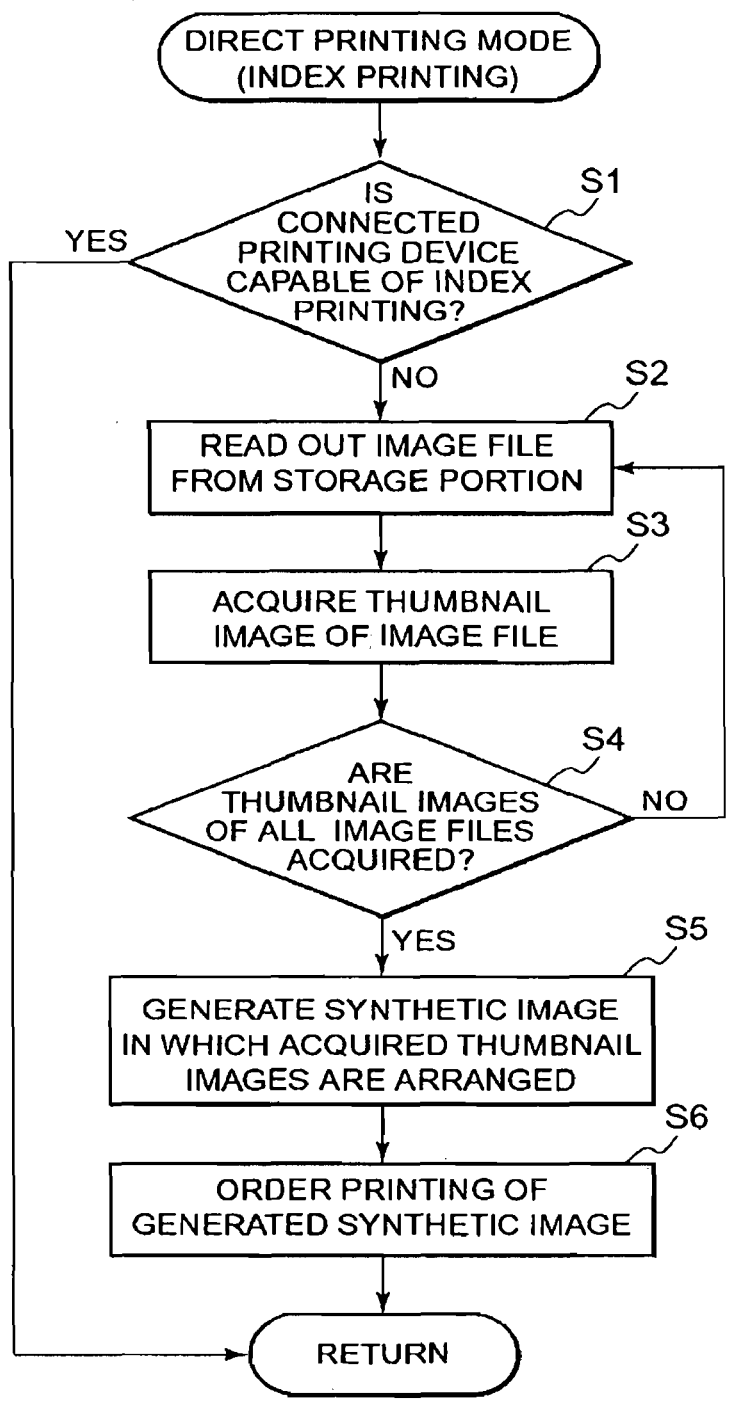
FIG. 2 is a flowchart showing actions performed in the case in which a user designates the index printing when a printing device is connected to the digital camera but not supporting the index printing.

FIG. 2 is a flowchart showing actions performed in the case in which a user instructs the index printing when the printing device which does not support the index printing is connected to the digital camera. In this instance, the flowchart of FIG. 2 shows contents of a process corresponding to S69 of FIG. 9.

As shown in FIG. 2, when the user instructs the index printing, the digital camera first determines whether or not the printing device is capable of performing the index printing, based on the previously acquired information of the printing function supported by the printing device. That is, the digital camera determines whether or not the printing device supports the index printing (S1).

If this determination result is Yes, the process for usual index printing instruction is performed. However, if this determination result is No, a image file for a shot image, which has not been read yet, is read from the storage portion 4 (S2), and then, a thumbnail image of the main image of the image file is acquired (S3). Next, it is determined whether or not the thumbnail images of the main images for all the shot images recorded in the storage portion 4 are already acquired (S4). If this determination result is No, the process is returned to S2. In this way, when the thumbnail images of the main images of all the shot images recorded in the storage portion 4 are acquired, the determination result of S4 turns Yes. Subsequently, one synthetic image, or a plurality of synthetic images, in each of which a predetermined number of the acquired thumbnail images are arranged, is/are generated (S5), and the instruction indicating the one synthetic image, or the plurality of the synthetic images as an image or images to be printed is sent to the printing device (S6).

Subsequently, the printing device which received this instruction sends the printing image data acquisition request (corresponding to S71 in FIG. 9), and in response to this, the digital camera sends the data of the one, or the plurality of the synthetic images to the printing device (corresponding to S72 in FIG. 9). The index printing is completed by printing these images in the printing device.

Figure 3:
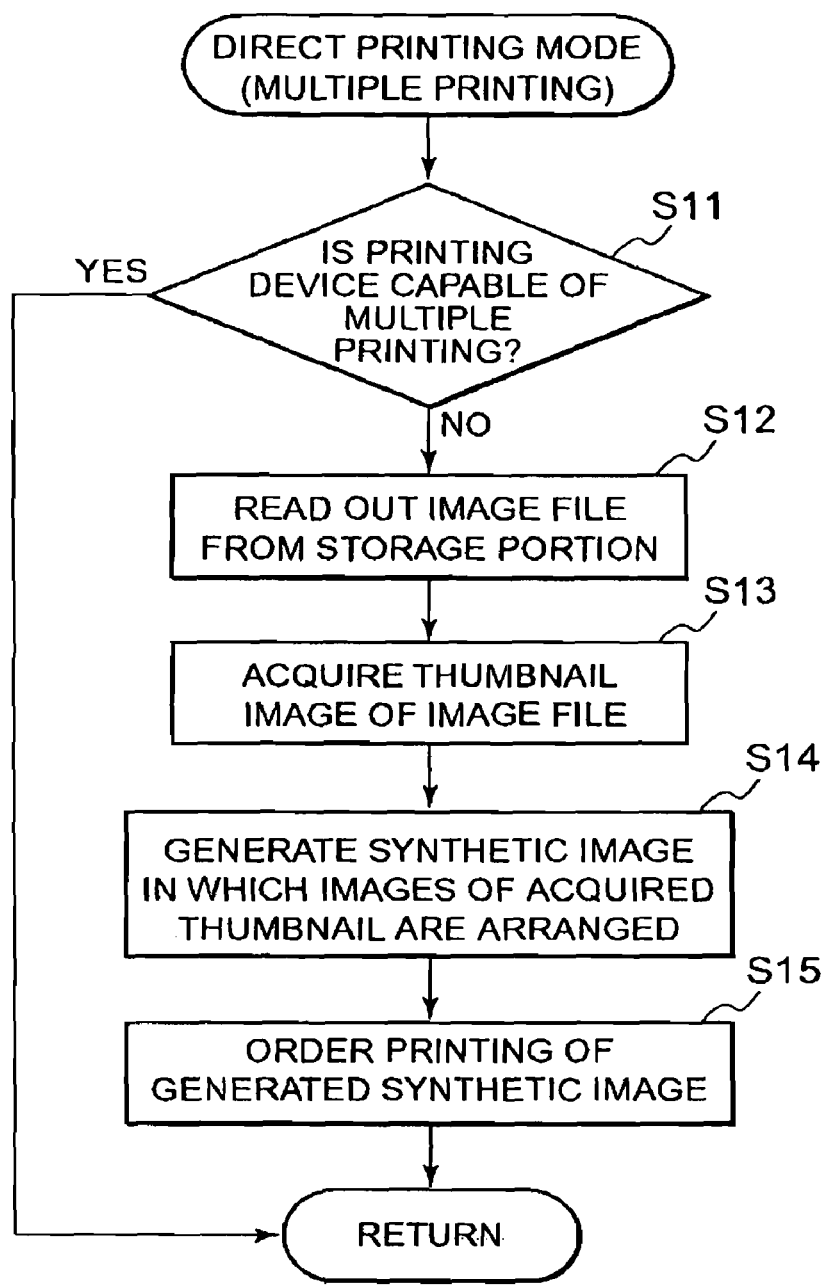
FIG. 3 is a flowchart showing actions performed in the case in which a user designates a multiple printing when a printing device is connected to the digital camera but not supporting the multiple printing.

FIG. 3 is a flowchart showing actions performed in the case in which the user designates a multiple printing when the printing device, which does not support the multiple printing, is connected to the digital camera. In this instance, the flowchart of the FIG. 3 also shows contents of a process corresponding to S69 of FIG. 9.

As shown in FIG. 3, when the user instructs the multiple printing, the digital camera first determines whether or not the printing device is capable of performing the multiple printing based on the previously acquired information of the printing function supported by the printing device. That is, the digital camera determines whether or not the printing device supports the multiple printing (S11).

If this determination result is Yes, the process for usual multiple printing instruction is performed. However, if this determination result is No, a image file for a shot image, which is the target of the multiple printing, is read from the storage portion 4 (S12), and a thumbnail image of the main image of the image file is acquired (S13). Subsequently, one synthetic image, or a plurality of synthetic images, in each of which a predetermined number of the acquired thumbnail images are arranged, is/are generated (S14), and the instruction indicating the one synthetic image, or the plurality of the synthetic images as images to be printed is sent to the printing device (S15).

Subsequently, the printing device which received this instruction sends the printing image data acquisition request (equivalent to S71 in FIG. 9), and in response to this, the digital camera sends the data of the synthetic image to the printing device (corresponding to S72 in FIG. 9). The multiple printing is completed by printing these images in the printing device.

Figure 4:
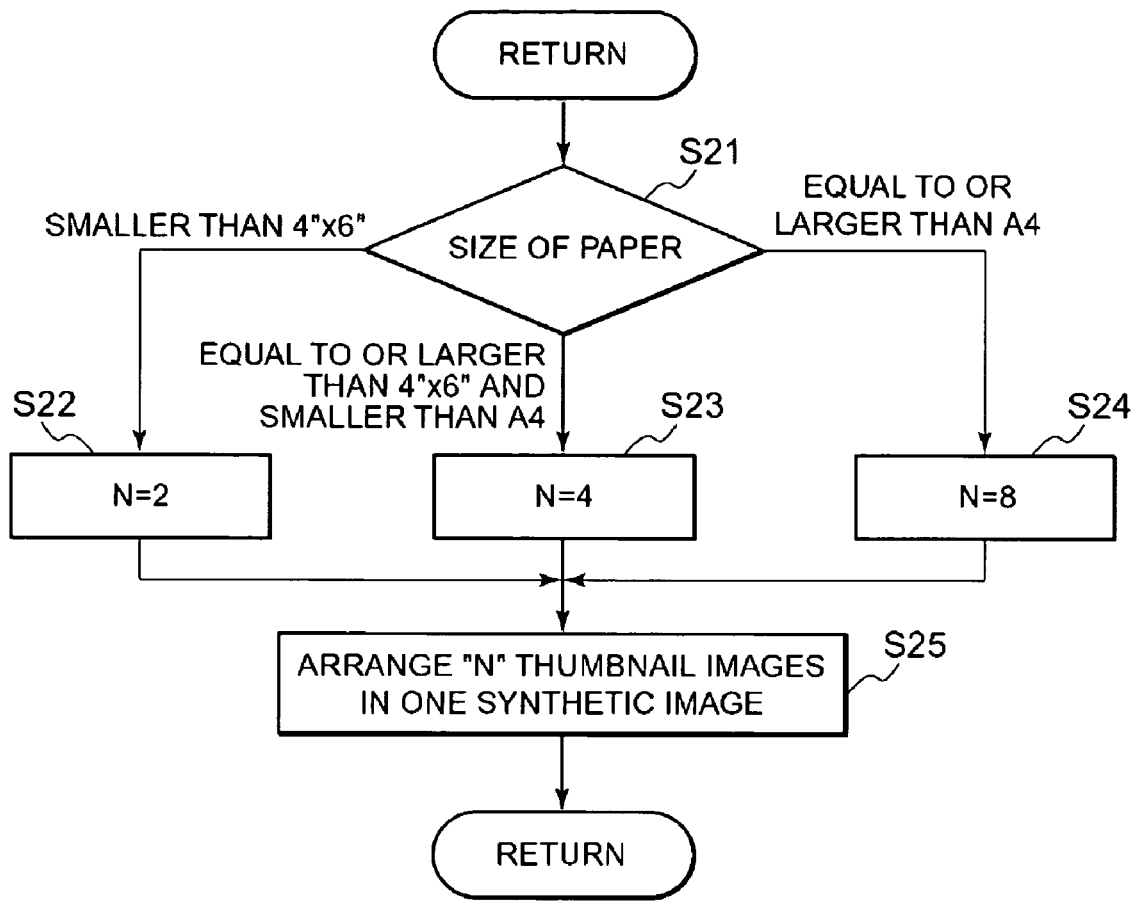
FIG. 4 is a flowchart showing a process for determining the number of thumbnail images which can be arranged in one synthetic image, based on the size of printing paper that the printing device supports.
Figure 5:
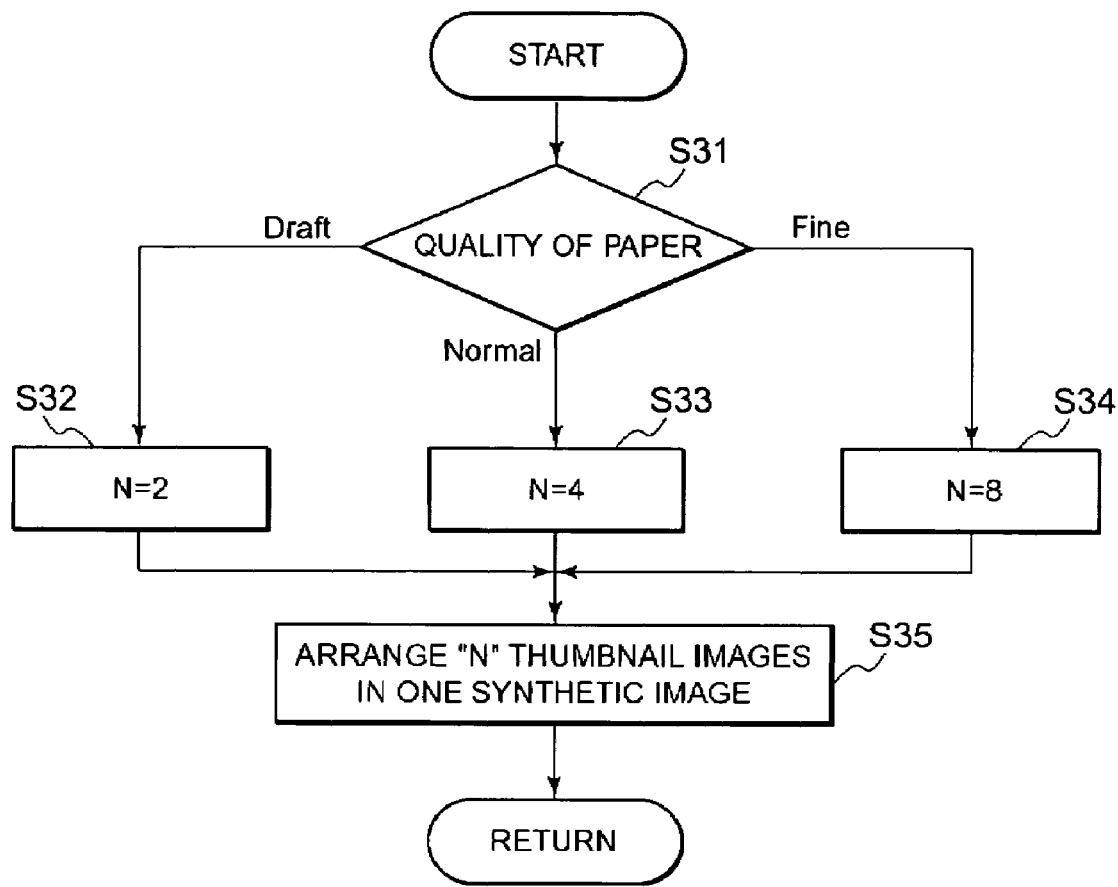
FIG. 5 is a flowchart showing a process for determining the number of thumbnail images which can be arranged in one synthetic image, based on the quality of the printing paper ("PaperQuality") that the printing device supports.
Figure 6:
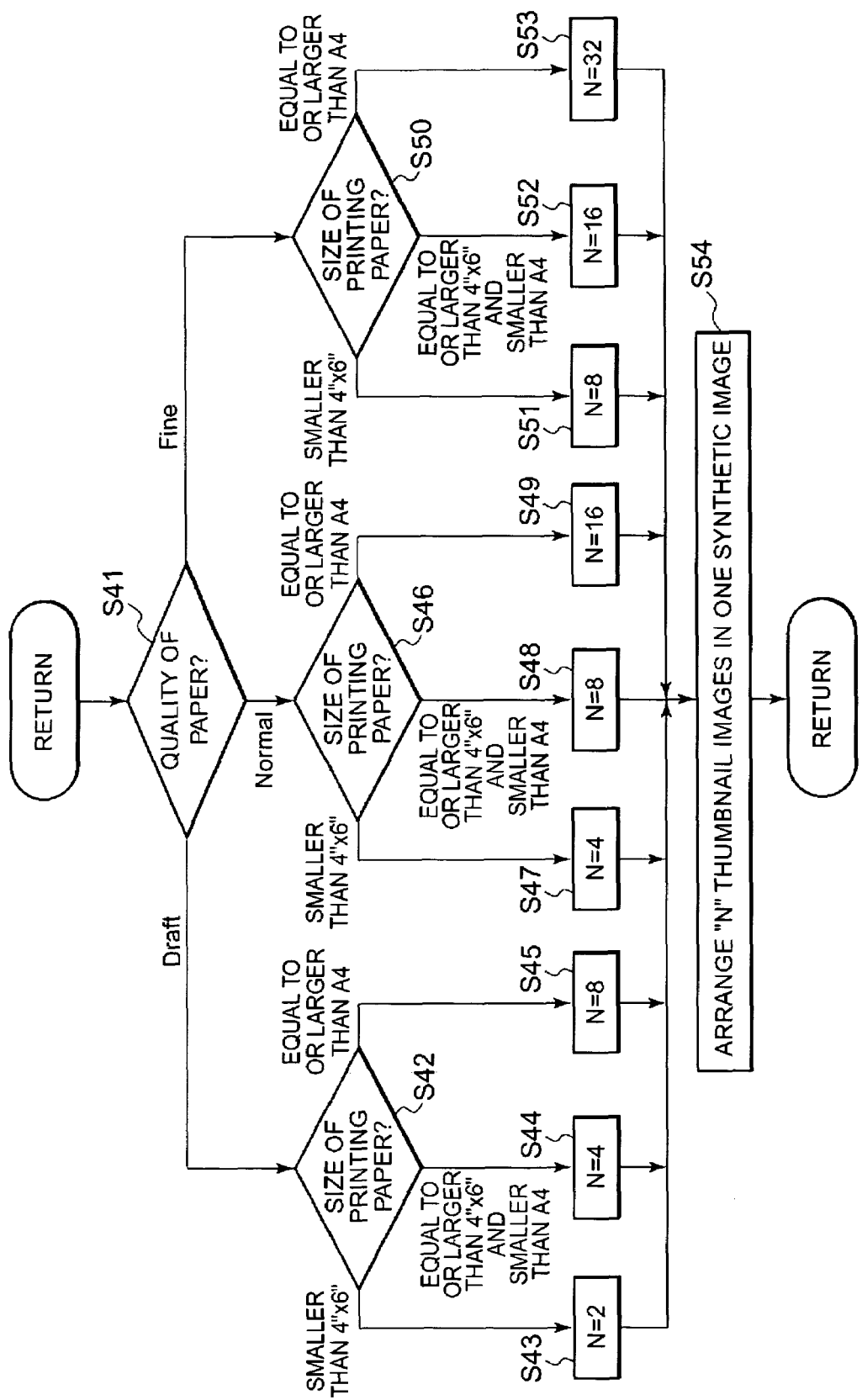
FIG. 6 is a flowchart showing a process for determining the number of thumbnail images which can be arranged in one synthetic image, based on the size of the printing paper and the quality of the printing paper ("PaperQuality") that the printing device supports.

FIGS. 4, 5 and 6 are flowcharts showing processes for determining the number of thumbnail images which can be arranged in one synthetic image in the above-mentioned S5 or S14.

FIG. 4 is the flowchart showing a process for determining the number of thumbnail images which can be arranged in one synthetic image, based on the size of printing paper that the printing device supports.

As shown in FIG. 4, in this process, the digital camera first acquires the printing functions from the printing device. The digital camera determines the size of the printing paper designated by the user out of the sizes of printing paper supported by the printing device(S21). However, if the printing device supports only one size, this size of printing paper is automatically designated (the same applies in S42, S46 and S50 of FIG. 6 described later).

If the determination result is "smaller than 4"×6" (smaller than 4 inches×6 inches)", N=2 is applied (S22), if the result is "equal to or larger than 4"×6" and smaller than A4", N=4 is applied (S23), and if the result is "equal to or larger than A4", N=8 is applied (S24).

Subsequently, in the case of the index printing, one synthetic image, or a plurality of synthetic images, in each of which N thumbnail images, out of all the acquired thumbnail images, are arranged (S25). In this instance, if the number of thumbnail images is less than N, the synthetic image is generated from that number of thumbnail images which is less than N. Thereby, N thumbnail images, or the number of thumbnail images which is less than N, are arranged in one synthetic image.

Also, in the case of the multiple printing, one synthetic image or a plurality of synthetic images, in each of which N of the one thumbnail images are arranged, is/are generated (S25). Thereby, N thumbnail images are arranged in one synthetic image.

Thus, according to the flowchart of FIG. 4, the larger number of thumbnail images are arranged in one synthetic image for the bigger size of the printing paper, and the less number of thumbnail images are arranged in one synthetic image for the smaller size of the printing paper.

FIG. 5 is a flowchart showing a process for determining the number of thumbnail images which can be arranged in one synthetic image, based on the quality of printing paper ("PaperQuality") that the printing device supports.

As shown in FIG. 5, in this process, the digital camera first acquires the printing functions from the printing device. The digital camera determines the quality of printing paper designated by the user out of the qualities of printing paper supported by the printing device (S31). However, if the printing device supports only one kind of quality of paper, this quality is automatically designated (the same applies in S41 of FIG. 6 described later).

If the determination result is "Draft" (the quality of paper: low)", N=2 is applied (S32), if the result is "Normal" (the quality of paper: middle), N=4 is applied (S33), and if the result is "Fine" (the quality of paper: high), N=8 is applied (S34).

The following process of S35 is performed in the same way as the process of S25 shown in FIG. 4.

Thus, according to the flowchart of FIG. 5, the larger number of thumbnail images are arranged in one synthetic image for the higher quality of printing paper, and the less number of thumbnail images are arranged in one synthetic image for the lower quality of printing paper.

FIG. 6 is a flowchart showing a-process for determining the number of thumbnail images which can be arranged in one synthetic image, based on the size of the printing paper and the quality of the printing paper ("PaperQuality") that the printing device supports. That is, FIG. 6 is a process which combines the process of FIG. 4 and the process of FIG. 5.

As shown in FIG. 6, in this process, the digital camera first acquires the printing functions from the printing device. The digital camera determines the quality of the printing paper designated by the user out of the qualities of the printing paper supported by the printing device(S41).

If the determination result is "Draft", then the digital camera determines the size of the printing paper designated by the user out of the sizes of the printing paper supported by the printing device which have already acquired by the printing device (S42). If the determination result is "smaller than 4"×6" (smaller than 4 inches×6 inches)", N=2 is applied (S43), if the result is "equal to or larger than 4"×6" and smaller than A4", N=4 is applied (S44), and if the result is "equal to or larger than A4", N=8 is applied (S45).

If the determination result of S41 is "Normal", then the digital camera determines the size of the printing paper designated by the user out of the sizes of the printing paper supported by the printing device which have already acquired by the printing device (S46). If the determination result is "smaller than 4"×6" (smaller than 4 inches×6 inches)", N=4 is applied (S47), if the result is "equal to or larger than 4"×6" and smaller than A4", N=8 is applied (S48), and if the result is "equal to or larger than A4", N=16 is applied (S49).

If the determination result of S41 is "Fine", then the digital camera determines the size of the printing paper designated by the user out of the sizes of the printing paper supported by the printing device which have already acquired by the printing device (S50). If the determination result is "smaller than 4"×6" (smaller than 4 inches×6 inches)", N=8 is applied (S51), if the result is "equal to or larger than 4"×6" and smaller than A4", N=16 is applied (S52), and if the result is "equal to or larger than A4", N=32 is applied (S53).

When the value of N is thereby determined, the following process of S54 is performed in the same way as the process of S25 shown in FIG. 4.

Thus, according to the flowchart of FIG. 6, the larger number of thumbnail images are arranged in one synthetic image for the higher quality and bigger size of the printing paper, and the less number of thumbnail images are arranged in one synthetic image for the lower quality and smaller size of the printing paper.

FIGS. 7A to 7C, and FIGS. 8A to 8C are views as examples of printing results in the case in which the index printing is performed in the printing device, which does not support the index printing and is connected to the digital camera.

Figure 7A:
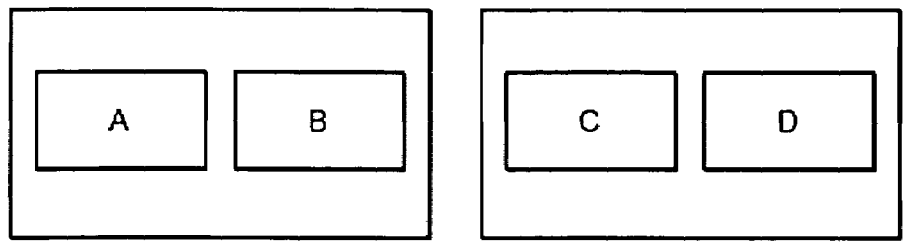
FIGS. 7A to 7C are views showing examples of printing results in the case in which the number of thumbnail images which can be arranged in one synthetic image is determined, based on the size of the printing paper that the printing device supports.
Figure 7B:
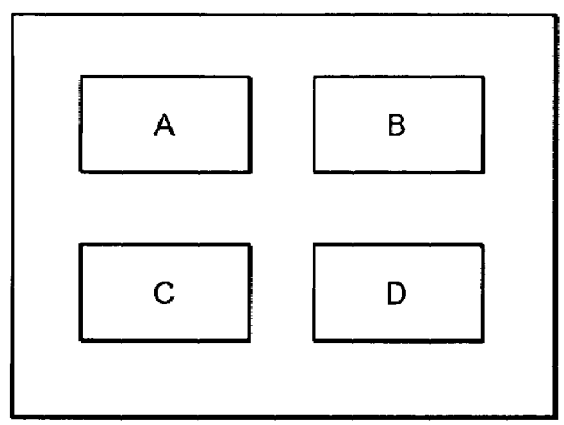
Figure 7C:
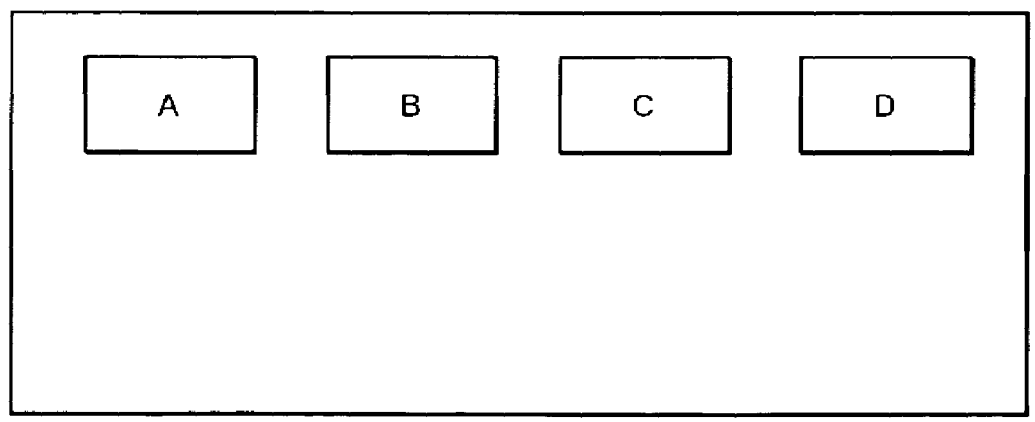

FIGS. 7A to 7C are views showing examples of the printing results in the case in which the number of thumbnail images which can be arranged in one synthetic image is determined, based on the size of the printing paper that the printing device supports (refer to FIGS. 2 and 4).

In the example of FIGS. 7A to 7C, it is assumed that four image files of shot images, A, B, C and D, are recorded in the storage portion 4.

FIG. 7A is a view showing an example of the printing result in the case in which "Postcard" is designated as the size of printing paper. In this case, N=2 is applied in the flowchart shown in FIG. 4, and the index printing is performed by printing two synthetic images, in each of which two thumbnail images are arranged. FIG. 7A is the printing result of this.

FIG. 7B is a view showing an example of a printing result in the case in which a "4"×6"" is designated as the size of printing paper. In this case, N=4 is applied in the flowchart shown in FIG. 4, and the index printing is performed by printing one synthetic image, in which four thumbnail images are arranged. FIG. 7B is the printing result of this.

FIG. 7C is a view showing an example of a printing result in the case in which "A4" is designated as the size of printing paper. In this case, N=8 is applied in the flowchart shown in FIG. 4, and the index printing is performed by printing one synthetic image in which eight thumbnail images are arranged. FIG. 7C is the printing result of this. However, in this case, there are only four image files of shot images, therefore only four thumbnail images are arranged.

Figure 8A:
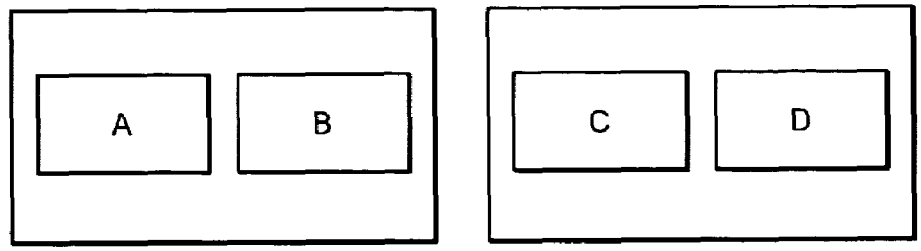
FIGS. 8A to 8C are views showing examples of printing results in the case in which the number of thumbnail images which can be arranged in one synthetic image is determined, based on the quality of the printing paper ("PaperQuality") that the printing device supports.
Figure 8B:
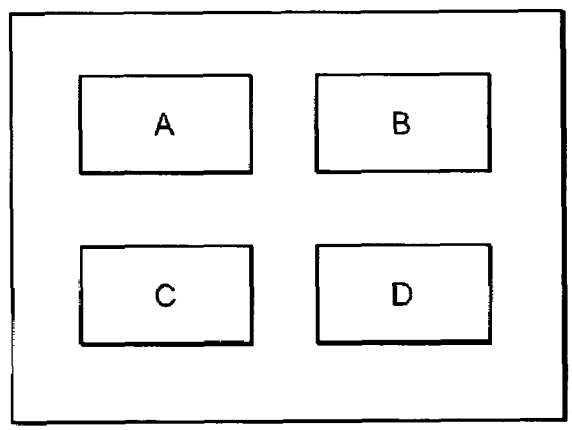
Figure 8C:
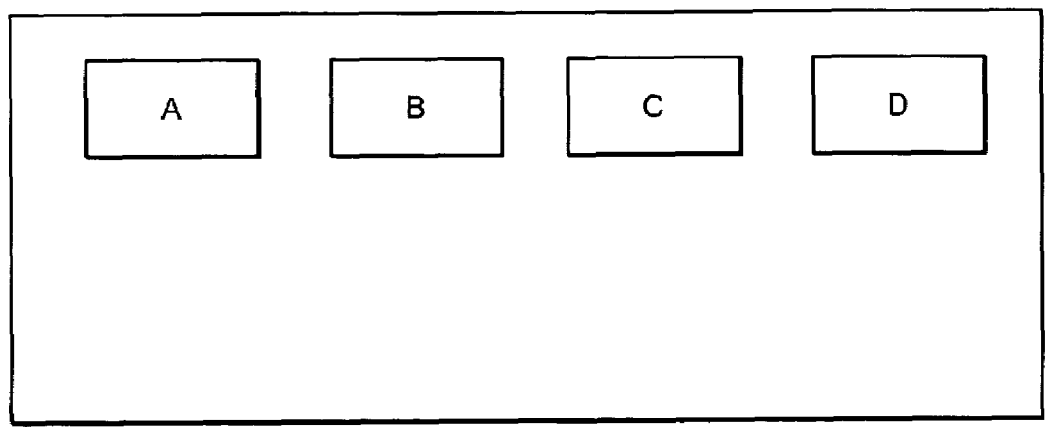

FIGS. 8A to 8C are views showing examples of printing results in the case in which the number of thumbnail images which can be arranged in one synthetic image is determined, based on the quality of paper ("PaperQuality") that the printing device supports (refer to FIGS. 2 and 5).

In the example of FIGS. 8A to 8C, it is also assumed that four image files of shot images, A, B, C and D, are recorded in the storage portion 4.

FIG. 8A is a view showing an example of a printing result in the case in which "Draft" is designated as the quality of the printing paper. In this case, N=2 is applied in the flowchart shown in FIG. 5, and the index printing is performed by printing two synthetic images in each of which two thumbnail images are arranged. FIG. 8A is the printing result of this.

FIG. 8B is a view showing an example of a printing result in the case in which "Normal" is designated as the quality of the printing paper. In this case, N=4 is applied in the flowchart shown in FIG. 5, and the index printing is performed by printing one synthetic image in which four thumbnail images are arranged. FIG. 8B is the printing result of this.

FIG. 8C is a view showing an example of a printing result in the case in which a "Fine" is designated as the quality of the printing paper. In this case, N=8 is applied in the flowchart shown in FIG. 5, and the index printing is performed by printing one synthetic image in which eight thumbnail images are arranged. FIG. 8C is the printing result of this. However, in this case, there are only four image files of shot images, therefore only four thumbnail images are allocated.

As described above, according to the present embodiment, when a digital camera and a printing device, which are equipped with a direct printing function, are directly connected to each other, even if the printing device does not support one of or both of the index printing and the multiple printing while the digital camera support the two of them, the index printing and/or the multiple printing can be performed. Therefore, the convenience for the user in the direct printing can be improved.

In the above-mentioned embodiments, the control portion 1 can be recognized as at least one of the following functions: a determination portion for determining whether or not the printing device supports the index printing (or the multiple printing) when the printing device is directly connected to the digital camera; a small image acquisition portion for acquiring small images of shot images recorded in the recording portion; and a synthetic image generation portion for generating a synthetic image, in each of which the small images are arranged.

While there has been shown and described what are considered to be preferred embodiments of the invention, it will, of course, be understood that various modifications and changes in form or detail could readily be made without departing from the spirit of the invention. It is therefore intended that the invention should not be limited to the exact forms described and illustrated, but constructed to cover all modifications that may fall within the scope of the appended claims.

What is claimed is:

1. A digital camera capable of printing shot images by directly connecting a printing device thereto, comprising:
    a determination portion for determining whether or not the printing device supports an index printing when the printing device is directly connected to the digital camera;
    a recording portion for recording shot images;
    a small image acquisition portion for acquiring small images of shot images recorded in the recording portion; and
    a synthetic image generation portion for generating a synthetic image by arranging small images therein;
    wherein when the index printing is performed in the case in which the determination portion determines that the printing device does not support the index printing, the small image acquisition portion acquires small images of all the shot images recorded in the recording portion, the synthetic image generation portion generates one or a plurality of synthetic images, in each of which a predetermined number of small images of all the shot images are arranged, and the one or the plurality of the synthetic images are sent to the printing device.

2. The digital camera according to claim 1, wherein the predetermined number is determined based on a size and/or a quality of printing medium supported by the printing device.

3. A printing method of a digital camera capable of printing shot images by directly connecting a printing device thereto, the method comprising:
    determining whether or not the printing device supports an index printing when the printing device is directly connected to the digital camera; and
    when the index printing is performed in the case in which it is determined that the printing device does not support the index printing, acquiring small images of all the shot images recorded in a recording portion, generating one or a plurality of synthetic images, in each of which a predetermined number of small images of all the small images are arranged, and sending the one or the plurality of the synthetic images to the printing device.

4. The printing method of the digital camera according to claim 3, wherein
    the predetermined number is determined based on a size and/or a quality of printing medium supported by the printing device.

* * * * *